United States Patent [19]

Yasuyama et al.

[11] Patent Number: 5,302,797
[45] Date of Patent: Apr. 12, 1994

[54] RESISTANCE WELDING OF ALUMINUM

[75] Inventors: Masanori Yasuyama, Amagasaki; Takao Taka, Ikoma; Kazuhiro Ogawa, Nishinomiya, all of Japan

[73] Assignee: Sumitomo Metal Industries, Ltd., Osaka, Japan

[21] Appl. No.: 936,515

[22] Filed: Aug. 28, 1992

[30] Foreign Application Priority Data

| Aug. 30, 1991 | [JP] | Japan | 3-246749 |
| Oct. 22, 1991 | [JP] | Japan | 3-304166 |
| Feb. 17, 1992 | [JP] | Japan | 4-069275 |

[51] Int. Cl.⁵ ............ B23K 11/11; B23K 11/20; B23K 11/18
[52] U.S. Cl. ............................................. 219/118
[58] Field of Search ............... 219/117.1, 118, 92

[56] References Cited

FOREIGN PATENT DOCUMENTS

| 51-72947 | 6/1976 | Japan . | |
| 53-48954 | 5/1978 | Japan | 219/118 |
| 55-100882 | 8/1980 | Japan | 219/92 |
| 56-117888 | 9/1981 | Japan | 219/118 |
| 57-56175 | 4/1982 | Japan . | |
| 4-55066 | 2/1992 | Japan . | |
| 4-81288 | 3/1992 | Japan . | |

OTHER PUBLICATIONS

"Technique For Resistance Welding Copper to Copper", by Hausman et al., *Technical Notes,* Publication of RCA, Dec. 1970.

*Primary Examiner*—Geoffrey S. Evans
*Attorney, Agent, or Firm*—Burns, Doane, Swecker & Mathis

[57] ABSTRACT

Placing a clad plate, comprising a resistor having a specific resistance at least two times that of aluminum, between two aluminum plates or between an aluminum plate and non-aluminum plate metal plate to be welded, and supplying an electric current through the aluminum plates to be welded and the clad plate. The clad plate itself may have aluminum plates sandwiching the resistor, the thickness each of the aluminum plate of the clad plate is from ¼ to 6 times that of the resistor. The resistor can be made of iron, steel, titanium, tantalum, nickel, zirconium, and alloys thereof.

20 Claims, 4 Drawing Sheets

FRACTURED AT BASE METAL
(BUTTON-LIKE FRACTURE)

RESISTANCE WELDING OF ALUMINUM

BACKGROUND OF THE INVENTION

The present invention relates to resistance welding of an aluminum alloy (hereunder referred to merely as aluminum), including resistance welding of aluminum to aluminum, aluminum to steel, aluminum to titanium, and aluminum to other foreign metals.

Joining of aluminum and aluminum can be carried out by arc welding or resistance welding using a large welding current. On the other hand, joining of aluminum and steel, and aluminum and titanium, for example, is usually carried out by mechanical means, because welding does not give a satisfactory bonding strength. However, mechanical joining methods using bolts, screws, and fittings have problems such as less reliability and loosening of joints during use.

Furthermore, since it is becoming more popular to assemble apparatuses, machines, or structures by means of welding, it is desirable that resistance welding of the aluminum, and especially the resistance welding of aluminum plates be practiced in industry using a small welding current.

There is a recent trend to employ increasing amounts of aluminum plates for the manufacture of car bodies in order to save weight and energy. For automotive manufacture it is necessary to develop a practical method of carrying out spot welding of aluminum plates.

A simple and reliable method for joining thick aluminum plates has recently been proposed. This method uses a cladded plate produced by bonding different kinds of metal plates prior to welding as an insert. The opposing sides of a plate and the insert are made of the same metal and are arc welded.

Japanese Unexamined patent application Publication No. 51-72947/1976 discloses an aluminum alloy plate spot welded to a steel plate using as an insert a previously cladded aluminum-steel plate between the aluminum and steel plates to be welded. The purpose of using the insert is to avoid formation of intermetallic compounds of aluminum. However, that application does not disclose any practical method to achieve spot welding of aluminum in an easy way using a small welding current.

Aluminum has high thermal and electrical conductivity compared with steel materials. This means that heat generation in aluminum is rather small compared with steel when the same electric current is supplied to carry out electric resistance welding. In addition, heat, once generated, is easily dissipated through the aluminum. Therefore, highly concentrated heating is required to achieve bonding of aluminum by applying a large electric current in a very short time.

When spot welding of steel plates and spot welding of aluminum plates having the same thickness are carried out for comparative purposes, a welding electric current in an amount three times larger than that for spot welding steel plates must be passed through the aluminum plates to be welded in a period of time only 1/7-⅓ of that for steel plates. Therefore, the spot welding of aluminum to aluminum is carried out with a welding apparatus of a large capacity using an electric current of 20-50 kA in a cycle of 5-10.

In the case of electric resistance welding of aluminum plates to steel plates, when an aluminum clad plate is employed as an insert, an aluminum-to-aluminum bonding interface must be welded by supplying a larger electric current in a much shorter time compared with the current and time required for welding a steel-to-steel interface, sometimes resulting in a variation in bonding strength depending on the location due to formation of uneven nuggets.

Japanese Unexamined patent application Publication No. 4-55066/1992 discloses a method of performing spot welding of an aluminum plate to a steel plate with an aluminum-steel clad plate being inserted between the aluminum and steel plates. In a first stage, an electric current in an amount suitable to effect welding of steel plates is passed through the plates, and then in a second stage a large electric current suitable to effect welding of aluminum plates is used. According to this method, however, two different melting conditions must be created, one for welding steel and the other for welding aluminum. It is rather difficult, therefore, to apply this process to an existing spot welding line from a practical viewpoint. In addition, sometimes excess generation of heat might occur to degrade bonding in the interface between an aluminum plate and the other plate of the clad plate.

Japanese Unexamined patent application Publication No. 4-1288/1992 discloses a method of effecting laser welding of an aluminum plate and a steel plate using a clad plate as an insert. In this method, laser welding is carried out under conditions such that each occurrence of welding takes place locally, i.e., in a very limited area without melting of different types of metals. From a practical viewpoint, it is quite difficult to effect welding in such a limited area even when laser welding is employed. In particular, laser welding is not applicable for welding thin aluminum plates such as outer panels, hood panels, and door panels for use in manufacturing car bodies.

SUMMARY OF THE INVENTION

A primary object of the present invention is to provide a method of easily carrying out resistance welding of aluminum utilizing an existing spot welding line for steel plate welding so as to produce reliable weld joints of high strength.

Another object of the present invention is to provide a method of carrying out spot welding between an aluminum plate and an aluminum plate, or between an aluminum plate and a different type of metal plate using a clad plate as an insert in order to manufacture automobiles.

The present inventors found that it is possible to efficiently carry out the resistance welding of aluminum plates by using as an insert a clad plate comprising a resistor such as stainless steel plate, and aluminum plates covering the stainless steel plate while adjusting the ratio of the thickness of the resistor and the thickness of each of the aluminum plates to be within a specific range.

Thus, the present invention is a method of effecting resistance welding of aluminum, characterized by preparing a clad plate comprising a resistor having a specific resistance two or more times that of aluminum, and aluminum plates having the resistor disposed between them with the thickness of each of the aluminum plates being from ¼ to 6 times that of the resistor, placing the clad plate between aluminum plates to be welded, and supplying an electric current through the aluminum plates and clad plate.

In the case of electric resistance welding of an aluminum plate and a plate of a metal other than aluminum, the plate of the other metal can be employed as the above-mentioned resistor. In this case the clad plate may comprise an aluminum plate and a plate of a metal different from aluminum and having a specific resistance two times that of aluminum.

Thus, in another aspect, the present invention is a method of effecting resistance welding of aluminum and a metal different from aluminum, characterized by preparing a clad plate comprising an aluminum plate and a plate of a metal having a specific resistance two or more times that of aluminum, placing the clad plate between an aluminum plate and a plate of metal different from aluminum to be welded, and supplying an electric current through the aluminum plate, clad plate and non aluminum metal plate under the conditions specified hereinafter.

The term "aluminum" means aluminum and aluminum alloys in this specification.

DETAILED DESCRIPTION OF THE PREFERRED EMBODIMENTS

The embodiments of the present invention can be classified into two categories: resistance welding of aluminum to aluminum, and resistance welding of aluminum to a metal different from aluminum.

Figure 1:
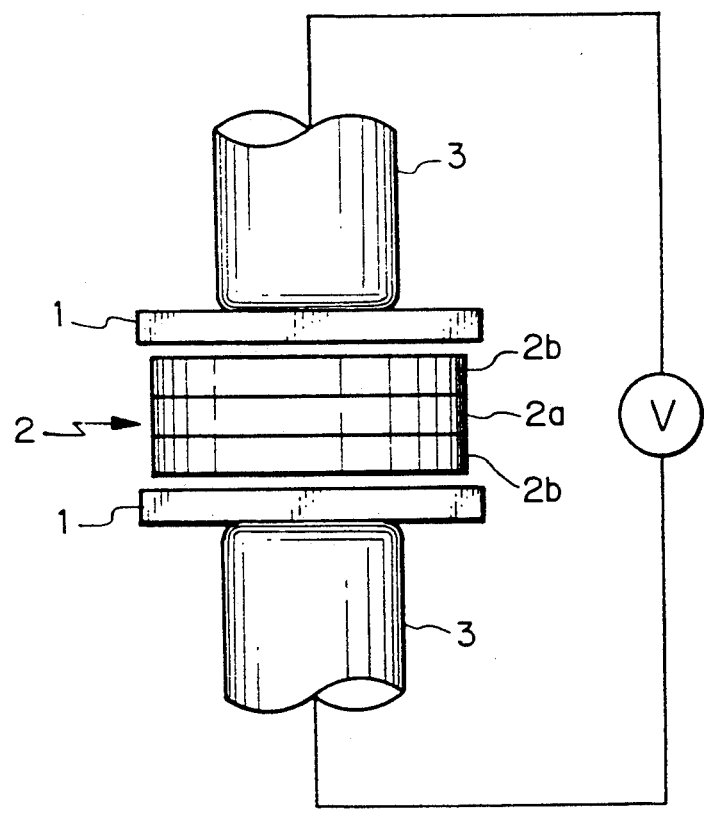
FIG. 1 is a schematic illustration of spot welding of aluminum to aluminum carried out by the resistance welding method of the present invention.

FIG. 1 illustrates resistance welding of aluminum to aluminum, in which concentrated heating is carried out in accordance with the method of the present invention. Aluminum plates 1,1 to be welded have a clad plate 2 disposed between them. The clad plate 2 comprises a resistor 2a and two aluminum plates 2b.

According to the present invention, when an electric current is passed through the aluminum plates 1,1, substantially only the resistor 2a of the clad plate 2 is intensely heated and increases in temperature, and the generated heat is transferred through the aluminum plates 2b, 2b on both sides to aluminum plates 1, 1. Thus, even when an electric current smaller than that conventionally required for carrying out welding of aluminum is supplied, the bonding interfaces between aluminum plate 1 and aluminum plate 2b are heated to a high enough temperature to form nuggets in the bonding interfaces.

Since the so-called clad interface between the resistor plate 2a and the aluminum plates 2b of the clad plate 2 is metallurgically bonded, the electric resistance of this interface is so small that the generation of heat is suppressed. Thus, the clad interface does not melt nor do adverse intermetallic compounds form. Of course there is no formation of intermetallic compounds in the interface between aluminum plate 2b and aluminum plate 1.

Therefore, according to the present invention there is no melting or formation of intermetallic compounds in the clad interface of the clad plate even if an electric current is passed through the clad plate.

The clad plate which is employed in the present invention may be produced by a conventional method, i.e., cladding by rolling, explosion, diffusion, and the like.

For the purpose of the present invention, the resistor must have a specific resistance two or more times that of aluminum (i.e., 2.4 $\mu\Omega$ cm) in order to ensure heat generation sufficient to effect bonding even when an electric current smaller than that conventionally required for welding aluminum in the prior art method is employed. Usually it is desirable that the specific resistance be 6 $\mu\Omega$ cm or more.

Examples of the resistor member include stainless steel the specific resistance of which is 70 $\mu\Omega$ cm, Fe (9.7 $\mu\Omega$ cm), Ti (42 $\mu\Omega$ cm), Ta (12.45 $\mu\Omega$ cm), Ni (6.84 $\mu\Omega$ cm), and Zr (40 $\mu\Omega$ cm).

The thickness of each of the aluminum plates of the clad plate is from $\frac{1}{4}$ to 6 times, preferably from 1 to 3 times the thickness of the resistor. When the thickness of the aluminum plate is greater than this upper limit, nuggets do not grow thoroughly in the bonding interface between the aluminum plates, resulting in poor bonding strength. On the other hand, when the thickness is smaller than the lower limit mentioned above, an aluminum melt formed in the bonding interface between the aluminum plates easily reacts with the resistor to form brittle intermetallic compounds. The aluminum plates 2b may have a different thickness from each other, but the thickness of each of the aluminum plates 2b must satisfy the above-identified conditions.

The total thickness of the clad plate 2 will vary depending on the capacity of the welding machine being used and other factors, but it is desirably less than 2 mm for a welding machine having a capacity of about 20 kA (maximum).

Another type of resistance welding method of the present invention will be described in conjunction with FIG. 2 in which an aluminum plate 10 and a steel plate 12 are bonded using a clad plate 13 as an insert. The clad plate 13 comprises an aluminum plate 13a and a plate 13b of a metal different from aluminum. The clad plate 13 is inserted between the aluminum plate 10 and the steel plate 12 such that the aluminum plate 10 contacts the aluminum side of the clad plate 13, and the steel plate 12 contacts the steel side of the clad plate 13. Reference numbers 14 indicate electrodes.

Figure 2:
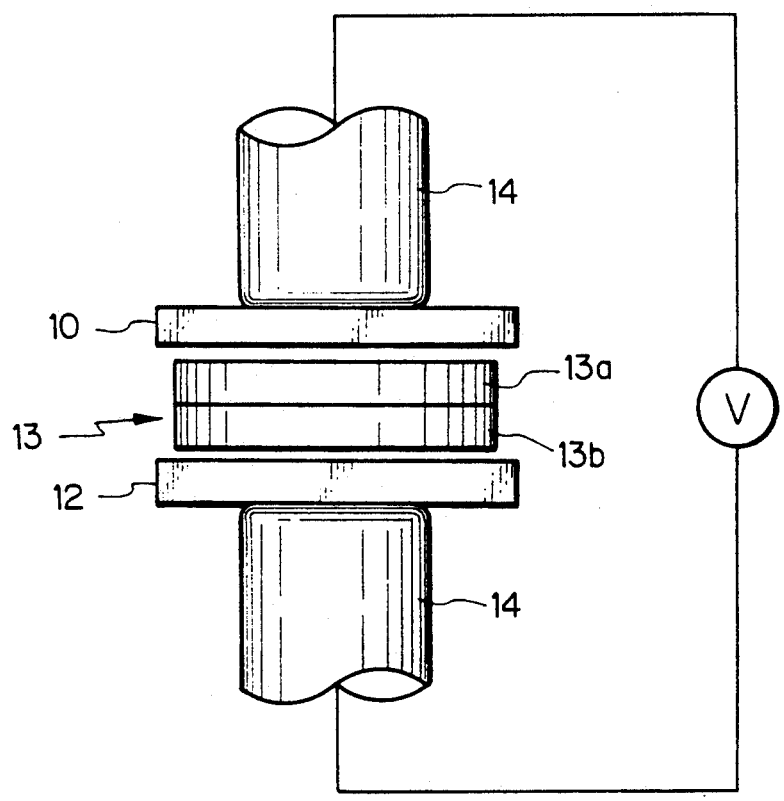
FIG. 2 is a schematic illustration of spot welding of aluminum to metal different from aluminum carried out by the resistance welding method of the present invention.

According to the present invention, as shown in FIG. 2, when an electric current is passed through the aluminum and steel plates 10 and 12, a bonding interface between the steel plates 12 and 13b is heated and melted to form a nugget, and the thus-generated heat is transferred through the clad interface to reach the aluminum plate 13a. The transferred heat causes melting of aluminum of the clad plate 13 along an electric flow path, and the heat reaches the bonding interface between the aluminum plate 13a and the aluminum plate 10. Thus, in the bonding interface between the aluminum plates, a nugget of aluminum is successfully formed. The nugget formed in the bonding interface is combined with a melt grown from the clad interface in the aluminum plate 13a to form a large nugget expanding from the cladding interface to the aluminum bonding interface.

According to this embodiment of the present invention, aluminum is welded to a metal different from aluminum using an aluminum-non-aluminum (steel) clad plate as an insert. The non-aluminum metal includes iron, steel, titanium, tantalum, nickel, zirconium, and alloys of each of them. Take the case of steel for example. Since the specific resistance of steel is larger than that of aluminum, supply of electric current through the plates generates heat at the steel-to-steel contact surface, and the thus generated heat serves to form a nugget in the bonding interface between the aluminum plates. Thus, there is no need to supply a large electric current in a short time, unlike usual aluminum-to-aluminum spot welding. This means that electric current supply conditions usually employed to achieve steel-to-steel spot welding can be applied to the spot welding of aluminum in accordance with the present invention.

In order to further improve the joint strength the ratio of the aluminum plate to that of the non-aluminum metal plate is preferably within the range of ¼ to 6. This is because the heat generated in the resistor of the clad plate serves to form a nugget at the bonding interface between the aluminum plates.

In another embodiment of the present invention, an aluminum plate and a plate of metal different from aluminum and having a specific resistance at least two times that of aluminum are spot welded under the following conditions (1)-(4):

$$t_A \cdot t_M \cdot t \leq 2.0 \tag{1}$$

$$0.25 \leq Y/X \leq 6 \tag{2}$$

$$I \leq 18 \tag{3}$$

$$I_o - 2 \leq I \leq I_o + 2 \tag{4}$$

wherein.

$$I_o = \left( \frac{25.6}{R_M \cdot X + R_A \cdot Y} + 3.2 \right) \cdot (t + 1.4) - 2.5 \tag{5}$$

$t_A$: Thickness of aluminum plate to be welded (mm)
$t_M$: Thickness of non-aluminum metal plate to be welded (mm)
t: Total thickness of clad plate (mm)
X: Thickness of non-aluminum plate of clad plate (mm)
Y: Thickness of aluminum plate of clad plate (mm)
$R_A$: Specific resistance of aluminum ($\mu\Omega \cdot cm$)
$R_M$: Specific resistance of non-aluminum metal ($\mu\Omega \cdot cm$)
I: Welding electric current (kA)
$I_O$: Optimum welding electric current (kA)

Figure 3:
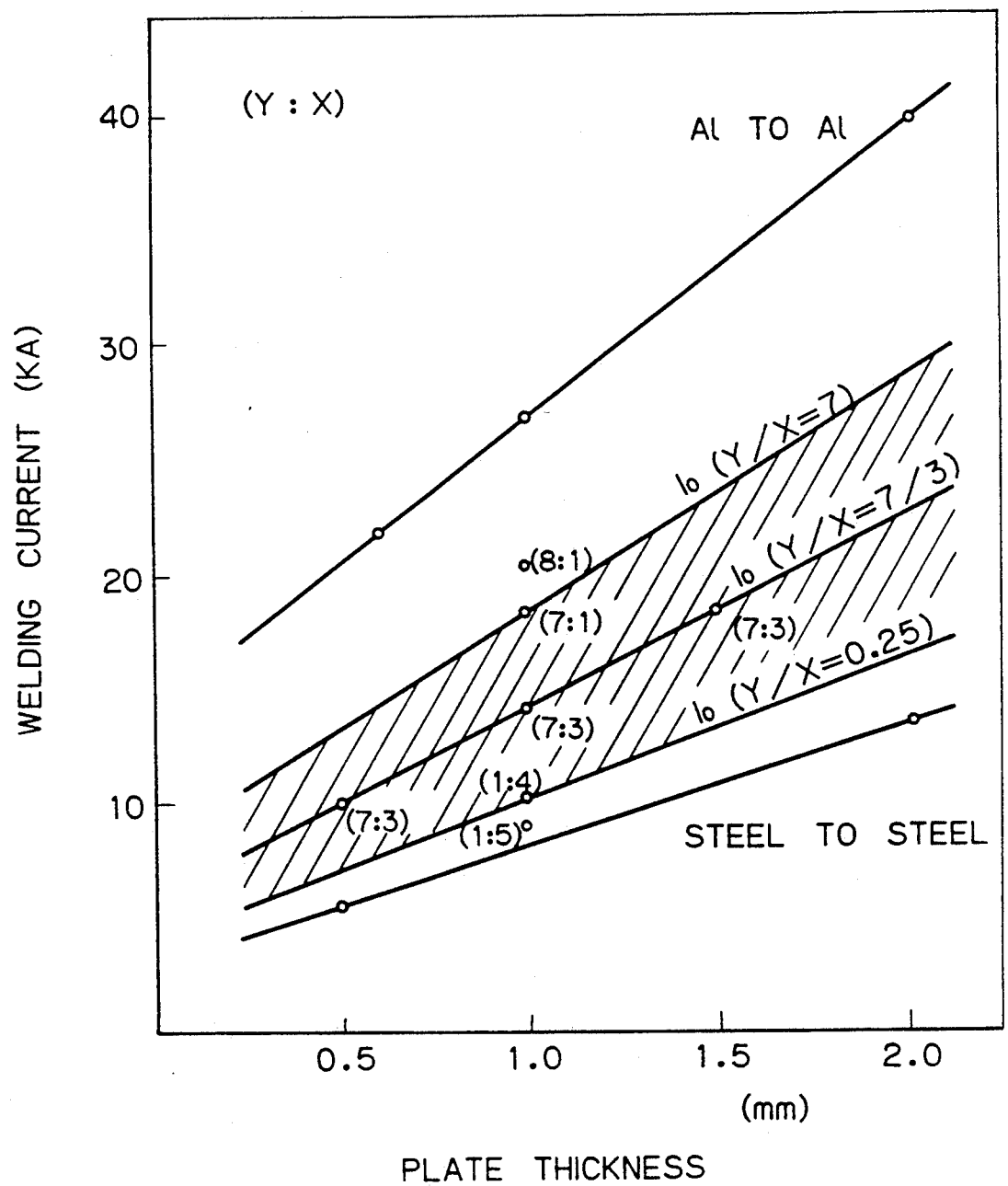
FIG. 3 is a graph showing relationships between the thickness of plates and an optimum welding current for various ratios of the thickness of each of aluminum plates to the thickness of a core resistor plate.

FIG. 3 is a graph showing relationships between the thickness of plates and an optimum welding current for various ratios of the thickness of either of the aluminum plates to the thickness of core resistor plate. These data were obtained by carrying out resistance welding (spot welding) of a steel plate and an aluminum plate in the manner shown in FIG. 2.

As is apparent from FIG. 3, the optimum welding current $I_o$ is expressed by the above formula. It decreases as the ratio of the steel thickness of the clad plate increases, but it is generally a little higher than that supplied for resistance welding of steel to steel, and it is markedly lower than that required to effect resistance welding of aluminum to aluminum by a prior art process.

Unexpectedly, according to the present invention, although an aluminum-to-aluminum contact surface exists, resistance welding can easily be effected using an electric current much lower than that required to effect aluminum-to-aluminum resistance welding by a conventional method. The present inventors experimentally confirmed that substantially the same relationship between the optimum welding current and the thickness ratio hold true even when the non-aluminum metal is other than steel.

When it is desirable to carry out resistance welding with a rather small weld heat input, the thicknesses $t_A$, $t_M$, and the total thickness (t) of the clad plate are restricted to not larger than 2 mm.

The ratio of Y/X is restricted to 0.25-7, preferably 0.25-6. When the ratio is larger than 6, i.e., when the thickness of the aluminum plate is much larger than that of a non-aluminum metal plate, the heat generated in the plate of the non-aluminum metal is smaller than that generated in the aluminum plate, and the formulas (3) and (4) for the welding electric current I and optimum welding current $I_o$ are not satisfied. As a result, an aluminum nugget is not formed in the bonding interface between aluminum plates and the bonding strength is degraded when a welding current in an amount necessary for effecting resistance welding of steel is supplied. In contrast, when the ratio is smaller than 0.25, i.e., when the thickness of an aluminum plate is much smaller than that of the non-aluminum metal plate, the optimum current $I_o$ calculated by the before described formula would result in an excess amount of heat generated, and an excess amount of aluminum would be melted. Therefore, expulsion and surface flash occur and sound welded joints cannot be obtained.

When the welding current I is adjusted to be within $I_o$ (optimum current) ±2 kA, a high stable level of bonding strength can be obtained. However, when the welding current I is lower than ($I_o$−2) kA, a nugget of sufficient volume is not formed, resulting in insufficient strength. On the other had, if the welding current I is higher than ($I_o$+2) kA, a nugget in the bonding interface between non-aluminum metal plates grows so large that it reaches the clad interface and breaks through it. As a result, the non-aluminum metal is commingled with molten aluminum to form brittle intermetallic compounds, due .o the presence of which the bonding strength decreases.

When it is desirable to carry out resistance welding with a rather small welding heat input, i.e., to use a welding machine with a small welding heat input suitable for welding steel, the welding current I is restricted to not higher than 18 kA.

Figure 4:
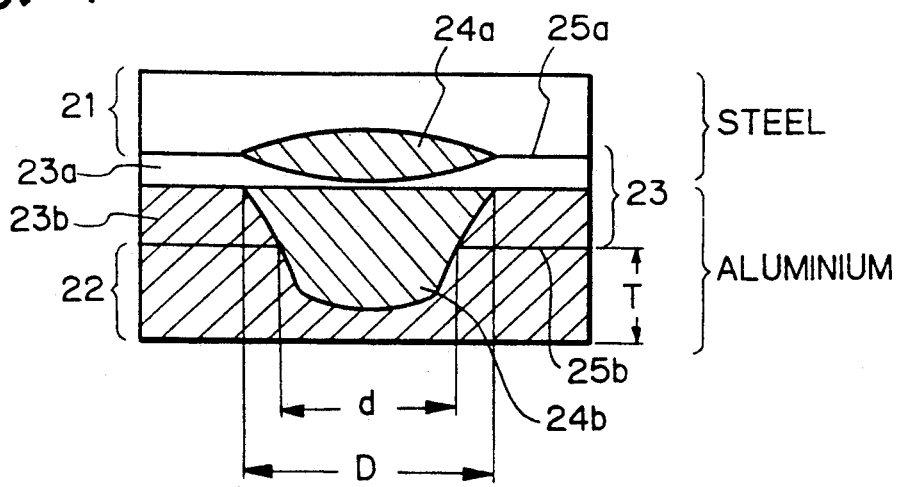
FIG. 4 is a schematic sectional view of a spot welding area of an aluminum plate and a plate of a metal different from aluminum produced by the resistance welding method of the present invention while interposing a clad plate between the aluminum and the different metal plate.

FIG. 4 shows another example in which an aluminum plate and a steel plate are resistance welded and two nuggets are formed in the bonding interface between steel plates and also in the bonding interface between aluminum plates.

In FIG. 4, an insert in the form of a clad plate 23 comprising a steel plate 23a and an aluminum plate 23b is disposed between a steel plate 21 and an aluminum plate 22 to be welded. Steel plate 23a and steel plate 21 are welded together, and aluminum plate 23b and aluminum plate 22 are welded together. In the two bonding interfaces 25a and 25b nuggets 24a and 24b, respectively, are formed.

So far as the steel-to-steel bonding is concerned, there is no problem regarding bonding strength. Thus, the joint strength is determined by the strength of the nugget 24b on the aluminum side of the joint and the bonding strength of the cladding interface in an area not thermally influenced during welding. When the strength of the nugget or the cladding interface is sufficient, the aluminum plate is broken.

It is well known to set the nugget diameter to $4 \times T^{\frac{1}{2}}$ or larger in order to ensure a satisfactory level of joint strength when a plate having a thickness T is spot welded. Thus, many resistance welding tests, in which a clad plate comprising aluminum and a different metal was used as an insert, were carried out to determine welding conditions suitable to achieve a sufficient level of joint strength.

It was found that when the diameter "d" of the nugget on the aluminum side is $4 \times T^{\frac{1}{2}}$ or larger, in which T is the thickness of an aluminum plate, the diameter D of the heat affected zone (HAZ) on the cladding interface can be expressed by the formula $D = 1.2 \times d$, and the conditions under which resistance welding can be carried out effectively without resulting in breakage of the aluminum plate can be expressed by a simple formula using the surface area "S" of the clad plate, the nugget diameter "d" on the aluminum side, and the thickness "T" of the aluminum plate.

Namely, when the bonding strength of the cladding interface is expressed by $\sigma_{clad}$, the strength of aluminum is expressed by $\sigma_{Al}$, then the critical conditions at which the aluminum base plate is broken can be expressed by the following Formula (6), which is reexpressed using the formula $D = 1.2 \times d$ to give Formula (7), and these formulas can be summarized to give Formula (8). Furthermore, since the minimum value for "d" is $4 \times T^{\frac{1}{2}}$, the conditions under which a satisfactory level of joint strength is ensured can be expressed by Formula (9).

$$\{(Planar\ Dimension\ of\ Clad\ Plate) - (Planar\ Dimension\ of\ Heat\text{-}Affected\ Zone\ of\ the\ Interface\ of\ Clad\ Plate)\} \times \sigma_{clad} > (Planar\ Dimension\ of\ Nugget\ on\ the\ aluminum\ side) \times \sigma_{AL} \quad (6)$$

$$\{S - (1.2 \cdot d/2)^2 \cdot \pi \cdot \sigma_{AL} \quad (7)$$

$$S > (\sigma_{AL}/\sigma_{clad} + 1.4) \cdot \pi d^2 / 4 \quad (8)$$

$$S > (\sigma_{AL}/\sigma_{clad} + 1.4) \cdot 4\pi T \quad (9)$$

As is apparent from the above, when the surface area S of the clad plate is adjusted to satisfy Formulas (8) or (9), the resistance welding of aluminum and a non-aluminum metal can be carried out successfully regardless of whether intermetallic compounds are formed in the clad interface.

It is to be noted that the above described relationship expressed by the Formula (8) or (9) can also be applied to resistance welding of aluminum to aluminum such as shown by FIG. 1.

Thus, according to still another embodiment of the present invention, an aluminum plate and an aluminum plate, or an aluminum plate and a plate of a metal which is different from aluminum and has a specific resistance at least two times that of aluminum are spot welded under the conditions that the surface area S of the clad plate satisfies the following relationship (10) or (11):

$$S > (\sigma_{AL}/\sigma_{clad} + 1.4) \cdot \pi d^2 / 4 \quad (10)$$

or, $$S > (\sigma_{AL}/\sigma_{clad} + 1.4) \cdot 4\pi T \quad (11)$$

$\sigma_{AL}$: Strength of aluminum (kgf/mm$^2$)
$\sigma_{clad}$: Strength of interface of clad plate (kgf/mm$^2$)
d: Diameter of nugget on the aluminum side (mm)
T: Thickness of aluminum plate (mm)

The present invention has been described with reference to the example in which a clad plate is used as an insert. However, instead of the provision of a clad plate between an aluminum plate and steel plate, an aluminum electroplating layer having a thickness of about 1-80 $\mu$m may be provided on the surface of a steel plate to be spot welded.

The present invention will further be described in conjunction with working examples which are presented merely for illustrative purposes.

EXAMPLE 1

Various clad plates were prepared using steel (Fe), stainless steel (SUS), titanium (Ti), tantalum (Ta), zirconium (Zr), and nickel (Ni) as a resistor, which was interposed between two aluminum plates to be welded, each having a thickness of 0.8 mm. An assembly of the resistor and two aluminum plates was hot rolled to produce a clad plate. The total thickness of the clad plate was 2.0 mm, but the ratio of the thickness of an aluminum plate and another metal plate was varied. The aluminum plates each having a thickness of 0.8 mm were spot welded using a clad plate under various conditions. In one comparative example, instead of the clad plate, a nickel plate was used as a single layer insert.

Electrodes of the RR type having a diameter of 6 mm were employed. The electrodes were pressed against the plates on both sides under a load of 200 kgf.

After welding, a cross tension test was carried out. The cross tension test will be further described in conjunction with the following examples. The joint strength was determined for each of the specimens in terms of configuration of a fracture. Test results are summarized in Table 1.

In Table 1, the term "button" means a configuration found after fracture in the cross tension test. It is a hole resembling a button hole left by the nugget and its surroundings upon being pulled out along the cracks. Therefore, the presence of a "button" indicates that satisfactory bonding was achieved. On the other hand, the term "flat" means a flat fracture with less plastic deformation and indicates that satisfactory bonding was not achieved.

As is apparent from Table 1, in order to obtain a sufficient level of bonding strength, it was necessary to apply a welding current of as high as 30 kA when an insert was not used. In addition, when the insert was a nickel plate, a brittle layer was formed in the bonding interface between the aluminum and steel plates at a welding current of 30 kA, resulting in an unsatisfactory level of bonding strength. When the welding current was as small as 12 kA, the heat generation at the bonding interface was not enough to give a satisfactory bonding strength.

Though it is not mentioned in Table 1, fracture occurred at the interface between an aluminum plate and a cladding steel layer when a clad plate of a steel plate and an aluminum plate was used.

In contrast, according to the present invention in which a resistor comprising aluminum, steel and aluminum layers was used, a satisfactory bonding strength could be obtained at a welding current of 12 kA. However, when the thickness of the aluminum of the clad plate was smaller or larger than that required for the present invention, a satisfactory joint strength was not obtained at a welding current of 12 kA.

a 0.8 mm Ta plate, a 0.8 mm Zr plate, and a 0.8 mm Ti plate using an Al-M (M: stainless steel, Ta, Zr, and Ti), respectively.

Figure 5:
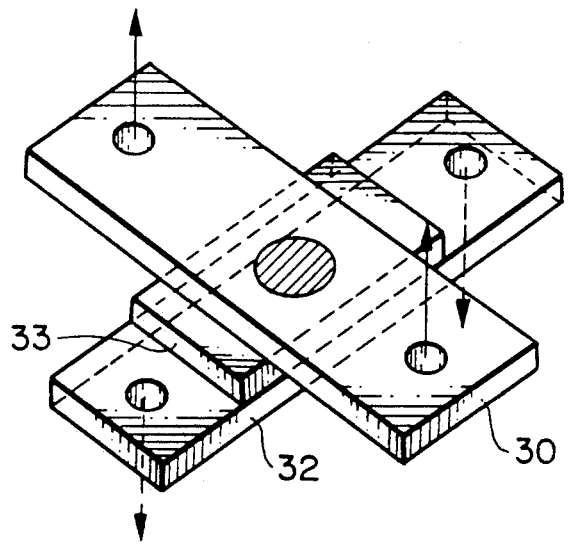
FIG. 5 is an illustration of how to carry out a cross tension test.

After welding, a cross tension test was carried out for each specimen as shown in FIG. 5, in which reference numeral 30 indicates a steel or other non-aluminum metal plate, 32 indicates an aluminum plate, and 33 indicates a clad plate. Pulling forces were applied as shown by arrows. The joint strength was determined for each of the specimens in terms of the configuration of a fracture. Test results are summarized in Tables 2 and 3.

Figure 6:
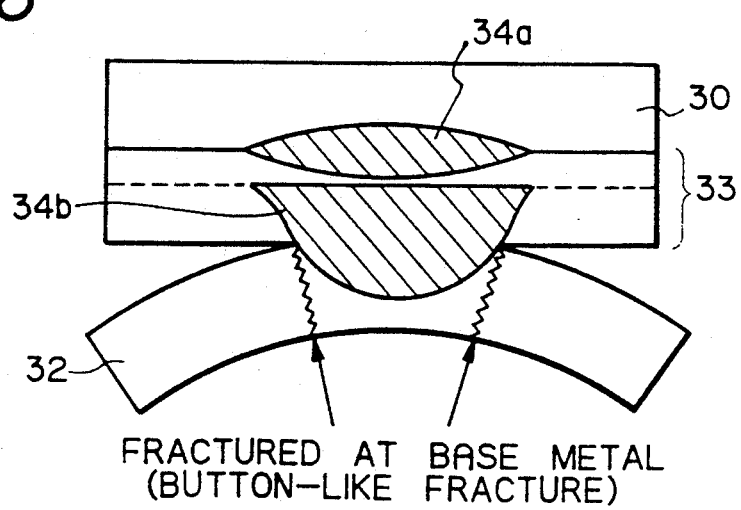
FIG. 6 is a schematic sectional view of a spot welding area, which shows development of button cracks after the cross tension test.

FIG. 6 schematically illustrates the formation of a button-like fracture. A button-like fracture is formed

TABLE 1

|  | | Clad Plate | Electric | | | |
|---|---|---|---|---|---|---|
|  | Resistor:M | Thickness (mm) Al:M:Al (Total) | Current (kA) | Cycle of Supply | Break Point Configuration | Remarks |
| Invention | Fe | 2:1:2 (2.0) | 12 | 6 | Al base Plate Button | O |
|  |  | 2:1:2 (2.0) | 14 | 6 | Al base Plate Button | O |
|  |  | 2:1:2 (2.0) | 12 | 10 | Al base Plate Button | O |
|  |  | 2:1:2 (2.0) | 14 | 10 | Al base Plate Button | O |
|  | Stainless | 2:1:2 (2.0) | 12 | 6 | Al base Plate Button | O |
|  | Zr | 2:1:2 (2.0) | 12 | 6 | Al base Plate Button | O |
|  | Ta | 2:1:2 (2.0) | 12 | 6 | Al base Plate Button | O |
|  | Ni | 2:1:2 (2.0) | 12 | 6 | Al base Plate Button | O |
|  | Ti | 2:1:2 (2.0) | 12 | 6 | Al base Plate Button | O |
| Comparative | Fe | 1:5:1 (2.0) | 12 | 6 | Bonding Interface Flat | X |
|  |  | 7:1:7 (2.0) | 12 | 6 | Bonding Interface Flat | X |
|  | None |  | 12 | 6 | Bonding Interface Flat | X |
|  |  |  | 30 | 6 | Al base Plate Button | O |
|  | None (Ni Insert) |  | 12 | 6 | Bonding Interface Flat | X |
|  |  |  | 30 | 6 | Bonding Interface Flat | X |

Note:
O: Good. X: Bad

EXAMPLE 2

An aluminum plate having a thickness of 1.0 mm and a steel (SPCD) plate having a thickness of 0.8 mm were spot welded using a clad plate having a total thickness of 0.5 mm, 1 mm, 1.5 mm, or 2.5 mm as an insert.

Another series of clad plates was also used to effect spot welding of an aluminum plate 1.0 mm thick to a 0.8 mm SUS 304 type steel (austenitic stainless steel) plate, when the nugget 34b and its surroundings are pulled out of the aluminum plate 32. A nugget 34a is also formed in the bonding interface between the non-aluminum metal plate 30 and the clad plate 33.

As is apparent from the results shown in Tables 2 and 3, a satisfactory level of aluminum to non-aluminum metal bonding was obtained by the present invention at a welding current

TABLE 2

|  | Non-aluminium Metal | Thickness of Clad Plate (mm) Al:M (Total) | Cycle of Supply | Electric Current (kA) | Calculated Optimum Welding Current $I_o$ (kA) | Break Point Configuration | Remarks |
|---|---|---|---|---|---|---|---|
| Invention | Steel | 7:3 (0.5) | 6 | 10 | 10.9 | Al base Plate Button | O |
|  |  | 7:3 (1.0) | 6 | 14 | 12.9 | Al base Plate Button | O |
|  |  | 7:3 (1.5) | 6 | 18 | 18.0 | Al base Plate Button | O |
|  |  | 1:4 (1.0) | 6 | 10 | 9.8 | Al base Plate Button | O |
|  |  | 7:1 (1.0) | 6 | 18 | 18.1 | Al base Plate Button | O |
|  | Stainless | 7:3 (1.0) | 6 | 8 | 6.7 | Al base Plate Button | O |
|  | Zr | 7:3 (1.0) | 6 | 8 | 8.1 | Al base Plate Button | O |
|  | Ta | 7:3 (1.0) | 6 | 10 | 9.5 | Al base Plate Button | O |
|  | Ti | 7:3 (1.0) | 6 | 8 | 8.3 | Al base Plate Button | O |

Note:
O: Good

TABLE 3

|  | Non-aluminium Metal | Thickness of Clad Plate (mm) Al:M (Total) | Cycle of Supply | Electric Current (kA) | Calculated Optimum Welding Current $I_o$ (kA) | Break Point Configuration | Remarks |
|---|---|---|---|---|---|---|---|
| Compartive | Steel | 8:1 (0.5) | 6 | 18 | 20.22 | Bonding Interface Flat | X |
|  |  | 1:5 (1.0) | 6 | 10 | 9.7 | Bonding Interface Flat | X |
|  |  | 7:3 (2.5) | 6 | 16 | 17.1 | Bonding Interface Flat | X |
|  |  | 7:3 (1.0) | 6 | 16 | 12.9 | Surface Flash | X |
|  |  | 7:3 (1.0) | 6 | 10 | 12.9 | Bonding Interface Flat | X |

TABLE 3-continued

| Non-aluminium Metal | Thickness of Clad Plate (mm) Al:M (Total) | Cycle of Supply | Electric Current (kA) | Calculated Optimum Welding Current $I_o$ (kA) | Break Point Configuration | Remarks |
|---|---|---|---|---|---|---|
| | 7:3 (1.5) | 6 | 20 | 18.0 | Surface Flash | X |
| | Clad None | 6 | 14 | — | Bonding Interface Flat | X |
| Aluminum to Alumnum (Without Clad Plate | | 6 | 14 | — | Bonding Interface Flat | X |
| | | 6 | 28 | — | Al base Plate Button | ○ |

Note:
—: Outside the range of the present invention.
○: Good, X: Bad

EXAMPLE 3

An aluminum plate of JIS 5000 series having a thickness of 1.0 mm and a steel plate (JIS G3141, SPCD) having a thickness of 0.8 mm were spot welded using various disc-shaped Al-steel clad plates having a thickness of 0.5-2.0 mm. The diameter of the disc-shaped clad plate was 6, 10, 14, 18, or 22 mm. The ratio of the thickness of the aluminum plate to that of the non-aluminum plate was 2.3.

A foreign metal plate other than the steel plate, i.e., stainless steel (SUS), titanium (Ti), tantalum (Ta), zirconium (Zr), or nickel (Ni) was also spot welded to the aluminum plate. In these cases, instead of the aluminum steel clad plate, an aluminum-foreign metal clad plate was used for each case.

After welding under conditions including a welding current of 10-16 kA, a welding time of 6 cycles (0.1 s), and a welding pressure of 200 kgf, a cross tension test was carried out for each specimen in the same manner as in Example 1. The joint strength was determined for each of the specimens in terms of the configuration of a fracture. Test results are summarized in Table 4.

As is apparent, according to the present invention, a satisfactory level of joint strength can be achieved at a weld current much lower than that required for a conventional method.

In this example, the resistance welding of the present invention was carried out by spot welding, but the present invention can be applied to other types of resistance welding, such as projection welding and seam welding.

TABLE 4

| Clad Plate | Thickness of Al Plate T(mm) | Diameter of Aluminum Nugget d(mm) | $4\sqrt{T}$ (mm) | Surface Area of Insert S(mm$^2$) | $\left(\dfrac{\sigma_{AL}}{\sigma_{clad}} + 1.4\right) \times 4\pi T$ | $\left(\dfrac{\sigma_{AL}}{\sigma_{clad}} + 1.4\right) \times \dfrac{\pi d^2}{4}$ | Break Point configuration | Remarks |
|---|---|---|---|---|---|---|---|---|
| Invention | | | | | | | | |
| Al/Steel | 0.5 | 2.9 | 2.8 | 25 π | 10.8 π | 11.35 π | Al base Plate · Button | ○ |
| | 1.0 | 4.2 | 4 | 25 π | 21.6 π | 23.8 π | Al base Plate · Button | ○ |
| | 1.5 | 4.9 | 4.9 | 49 π | 32.4 π | 32.4 π | Al base Plate · Button | ○ |
| | 2.0 | 5.8 | 5.7 | 49 π | 43.2 π | 45.4 π | Al base Plate · Button | ○ |
| Al/Stainless | 1.0 | 4.3 | 4 | 25 π | 21.6 π | 24.9 π | Al base Plate · Button | ○ |
| Al/Zr | 1.0 | 4.2 | 4 | 25 π | 21.6 π | 23.8 π | Al base Plate · Button | ○ |
| Al/Ta | 1.0 | 4.1 | 4 | 25 π | 21.6 π | 22.6 π | Al base Plate · Button | ○ |
| Al/Ti | 1.0 | 4.2 | 4 | 25 π | 21.6 π | 23.8 π | Al base Plate · Button | ○ |
| Al/Ni | 1.0 | 4.2 | 4 | 25 π | 21.6 π | 23.8 π | Al base Plate · Button | ○ |
| Comparative | | | | | | | | |
| Al/Steel | 0.5 | 2.9 | 2.8 | 9 π | 10.8 π | 11.35 π | Bonding Interface Flat | x |
| | 1.0 | 4.2 | 4 | 9 π | 21.6 π | 23.8 π | Bonding Interface Flat | x |
| | 1.5 | 4.9 | 4.9 | 25 π | 32.4 π | 32.4 π | Bonding Interface Flat | x |
| | 2.0 | 5.8 | 5.7 | 25 π | 43.2 π | 45.4 π | Bonding | x |

TABLE 4-continued

| Clad Plate | Thickness of Al Plate T(mm) | Diameter of Aluminum Nugget d(mm) | $4\sqrt{T}$ (mm) | Surface Area of Insert S(mm$^2$) | $\left(\dfrac{\sigma_{AL}}{\sigma_{clad}} + 1.4\right) \times 4\pi T$ | $\left(\dfrac{\sigma_{AL}}{\sigma_{clad}} + 1.4\right) \times \dfrac{\pi d^2}{4}$ | Break Point · configuration | Remarks |
|---|---|---|---|---|---|---|---|---|
| Invention | | | | | | | Interface Flat | |
| Al/Steel/Al | 1.0 | 4.2 | 4 | 25 π | 21.6 π | 23.8 π | Al base Plate · Button | ○ |
| Al/Steel/Al | 0.5 | 2.9 | 2.8 | 25 π | 10.8 π | 11.35 π | Al base Plate · Button | ○ |

Note:
○: good
x: bad

We claim:

1. A method of effecting resistance welding of aluminum to aluminum, characterized by placing a clad plate between first and second aluminum plates to be welded, the clad plate comprising a resistor between third and fourth aluminum plates, the resistor having a specific resistance at least two times that of aluminum, and supplying an electric current through the aluminum plates to be welded and the clad plate.

2. A method set forth in claim 1 wherein the thickness of each aluminum plate of the clad plate is from ¼ to 6 times that of the resistor.

3. A method as set forth in claim 1 wherein the resistor is made of a metal selected from the group consisting of iron, steel, titanium, tantalum, nickel, zirconium, and alloys thereof.

4. A method as set forth in claim 3 wherein the resistor is made of industrial pure Fe or steel.

5. A method as set forth in claim 1 wherein the resistance welding is carried out with a welding current of 20 kA or less, weld time of 2 cycles or more, and an electrode force of 300 kgf or less.

6. A method as set forth in claim 3 wherein the resistor is made of nickel or an alloy thereof.

7. A method as set forth in claim 1 wherein the thickness of each of the aluminum plates to be welded is 2.0 mm or less, and the thickness of the clad plate is 2.0 mm or less.

8. A method of effecting resistance welding of aluminum to aluminum, characterized by placing a clad plate between first and second aluminum plates to be welded, the clad plate comprising a resistor between third and fourth aluminum plates, the resistor having a specific resistance at least two times that of aluminum, and supplying an electric current through the aluminum plates to be welded and the clad plate, the resistor being made of titanium or an alloy thereof.

9. A method of effecting resistance welding of aluminum to a metal different from aluminum, characterized by placing a clad plate between a first aluminum plate and a first non-aluminum plate to be welded, the clad plate comprising a second aluminum plate and a second plate of non-aluminum metal having a specific resistance two or more times that of aluminum, and supplying an electric current through the first aluminum plate, the clad plate, and the first non-aluminum metal plate, the electric current being constant and the clad plate being spot welded to the first aluminum plate and the first non-aluminum plate during the supplying of the electric current through the first aluminum plate, the clad plate and the first non-aluminum plate.

10. A method as set forth in claim 9 wherein the metal different from aluminum is a metal selected from the group consisting of iron, steel, titanium, tantalum, nickel, zirconim, and alloys each of them.

11. A method as set forth in claim 10 wherein the resistor is made of industrial pure Fe or steel.

12. A method as set forth in claim 9 wherein the thickness of the aluminum plate of the clad plate is adjusted to be from ¼ to 6 times that of the non-aluminum plate of the clad plate.

13. A method as set forth in claim 9 wherein the resistance welding is carried out with a welding current of 20 kA or less, a weld time of 2 cycles or more, and an electrode force of 300 kgf or less.

14. A method of effecting resistance welding of aluminum to a metal different from aluminum, characterized by placing a clad plate between a first aluminum plate and a first non-aluminum plate to be welded, the clad plate comprising a second aluminum plate and a second plate of a non-aluminum metal having a specific resistance two or more times that of aluminum, and supplying an electric current through the first aluminum plate, the clad plate, and the first non-aluminum metal plate, the metal different from aluminum being a metal selected from the group consisting of iron, steel, titanium, tantalum, nickel, zirconium, and alloys thereof, the resistor being made of titanium or an alloy thereof.

15. A method of effecting resistance welding of aluminum to a metal different from aluminum, characterized by placing a clad plate between a first aluminum plate and a first non-aluminum plate to be welded, the clad plate comprising a second aluminum plate and a second plate of a non-aluminum metal having a specific resistance two or more times that of aluminum, and supplying an electric current through the first aluminum plate, the clad plate, and the first non-aluminum metal plate, the metal different from aluminum being a metal selected from the group consisting of iron, steel, titanium, tantalum, nickel, zirconium, and alloys thereof, the resistor being made of nickel or an alloy thereof.

16. A method as set forth in claim 9 wherein the resistance welding is carried out using as an insert a clad plate having a surface area S:

$$S(mm^2) > (\sigma AL(kgf/mm^2)/\sigma clad(kgf/mm^2) + 1.4) \cdot \pi d(mm)^2/4 \quad (10)$$

$$S(mm^2) > (\sigma AL(kgf/mm^2)/\sigma\text{-}clad(kgf/mm^2)+1.4)\cdot 4\pi T(mm) \quad (11)$$

$\sigma$AL: Strength of aluminum (kgf/mm$^2$)
$\sigma$clad: Strength of interface of clad plate (kgf/mm$^2$)
d: Diameter of nugget on the aluminum side (mm)
T: Thickness of aluminum plate (mm)

17. A method as set forth in claim 9 wherein the resistance welding is carried out under the following conditions:

$$tA(mm)tM(mm)t(mm) \leq 2.0 \quad (1)$$

$$0.25 \leq Y(mm)/X(mm) \leq 6 \quad (2)$$

$$I(kA) \leq 18 \quad (3)$$

$$I^o(kA)-2 \leq I(kA) \leq I^o(kA)+2 \quad (4)$$

wherein, $$Io = \left( \frac{25.6}{0.1\, R_M\,(\mu\Omega\cdot mm)\cdot X(mm) + 0.1\, R_A\,(\mu\Omega\cdot mm)\cdot Y(mm)} + 3.2 \right)\cdot (t(mm)+1.4) - 2.5 \quad (5)$$

tA: Thickness of aluminum plate to be welded (mm)
tM: Thickness of non-aluminum metal plate to be welded (mm)
t: Total thickness of clad plate (mm)
X: Thickness of non-aluminum plate of clad plate (mm)
Y: Thickness of aluminum plate of clad plate (mm)
RA: Specific resistance of aluminum ($\mu\Omega$·cm)
RM: Specific resistance of non-aluminum metal ($\mu\Omega$·cm)
I: Welding electric current (kA)
Io: Optimum welding electric current (kA).

18. A method of effecting resistance welding of aluminum to aluminum, characterized by placing a clad plate between first and second aluminum plates to be welded, the clad plate comprising a resistor between third and fourth aluminum plates, the resistor having a specific resistance at least two times that of aluminum, and supplying an electric current through the aluminum plates to be welded and the clad plate, the thickness of each aluminum plate of the clad plate being from ¼ to 6 times that of the resistor.

19. A method as set forth in claim 18 wherein the resistance welding is carried out with a welding current of 20 kA or less, a weld time of 2 cycles or more, and an electrode force of 300 kgf or less.

20. A method as set forth in claim 18 wherein the resistance welding is carried out using an insert a clad plate having a surface are S:

$$S(mm^2) > \sigma AL(kgf/mm^2)/\sigma\text{-}clad(kgf/mm^2)+1.4)\cdot \pi d(mm)^2/4 \quad (10)$$

or, $$S(mm^2) > (\sigma AL(kgf/mm^2)/\sigma\text{-}clad(kgf/mm^2)+1.4)\cdot 4\pi T(mm)$$

$\sigma$AL: Strength of aluminum (kgf/mm$^2$)
$\sigma$clad: Strength of interface of clad plate (kgf/mm$^2$)
d: Diameter of nugget on the aluminum side (mm)
T: Thickness of aluminum plate (mm).

* * * * *